(12) United States Patent
Janke et al.

(10) Patent No.: US 8,918,679 B2
(45) Date of Patent: Dec. 23, 2014

(54) APPARATUS AND METHOD FOR CHECKING AN ERROR DETECTION FUNCTIONALITY OF A DATA PROCESSOR

(75) Inventors: Marcus Janke, Munich (DE); Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 396 days.

(21) Appl. No.: 11/622,775

(22) Filed: Jan. 12, 2007

(65) Prior Publication Data

US 2007/0277070 A1 Nov. 29, 2007

(30) Foreign Application Priority Data

Jan. 13, 2006 (DE) .......................... 10 2006 001 872

(51) Int. Cl.
| | | |
|---|---|---|
| *G06F 11/00* | (2006.01) | |
| *G06F 11/277* | (2006.01) | |
| *G06F 11/22* | (2006.01) | |
| *G06F 21/72* | (2013.01) | |
| *G06F 21/75* | (2013.01) | |
| *G06F 21/77* | (2013.01) | |

(52) U.S. Cl.
CPC ............ *G06F 11/2215* (2013.01); *G06F 21/72* (2013.01); *G06F 21/75* (2013.01); *G06F 21/77* (2013.01)
USPC .................................. 714/41; 714/23; 714/25

(58) Field of Classification Search
USPC ................................................. 714/41, 23, 25
See application file for complete search history.

(56) References Cited

U.S. PATENT DOCUMENTS

| | | | | |
|---|---|---|---|---|
| 3,699,323 | A | * 10/1972 | Reinheimer | .................... 708/531 |
| 3,959,638 | A | * 5/1976 | Blum et al. | ...................... 714/11 |
| 4,048,481 | A | * 9/1977 | Bailey et al. | ..................... 714/41 |
| 4,837,624 | A | 6/1989 | Heitmann et al. | |
| 4,951,282 | A | 8/1990 | Mester | |
| 5,251,219 | A | 10/1993 | Babb | |
| 5,341,428 | A | * 8/1994 | Schatz | .......................... 713/185 |
| 5,515,383 | A | 5/1996 | Katoozi | |
| 5,686,885 | A | 11/1997 | Bergman | |
| 5,736,777 | A | * 4/1998 | Shield et al. | ................... 257/529 |
| 5,872,790 | A | 2/1999 | Dixon | |
| 5,872,910 | A | * 2/1999 | Kuslak et al. | .................... 714/41 |
| 6,223,309 | B1 | 4/2001 | Dixon et al. | |
| 6,654,648 | B2 | * 11/2003 | Nada et al. | ...................... 700/19 |

(Continued)

OTHER PUBLICATIONS

Wikipedia's Coprocessor version from Nov. 25, 2005 http://en.wikipedia.org/w/index.php?title=Coprocessor&oldid=29213223.*

*Primary Examiner* — Joseph Schell
(74) *Attorney, Agent, or Firm* — Schiff Hardin LLP

(57) ABSTRACT

An apparatus for checking an error detection functionality of a data processing circuit, comprising an arithmetic logic unit, which provides an output datum based on an input datum, and an error detection circuit that executes the error detection functionality and detects an error based on the output datum during correct execution of the error detection functionality, and generates an error signal, if an error is present, which comprises a control circuit that passes the error signal through to an error signal output in a normal operating mode, and blocks the error signal in a checking mode, does not let the error signal pass to the error signal output, influences the arithmetic logic unit, the error detection circuit or the input datum such that the error detection circuit detects an error during correct execution of the error detection functionality, and, if no error signal is received in response to influencing, outputs an alarm signal indicating an incorrect execution of the error detection functionality.

10 Claims, 2 Drawing Sheets

(56) References Cited

U.S. PATENT DOCUMENTS

| | | |
|---|---|---|
| 6,658,606 B1 | 12/2003 | Link et al. |
| 6,799,287 B1 | 9/2004 | Sharma et al. |
| 6,967,743 B1 | 11/2005 | Kumazawa |
| 7,120,846 B2 | 10/2006 | Kawagishi et al. |
| 7,406,628 B2 * | 7/2008 | Edgar et al. ............... 714/43 |
| 7,444,551 B1 * | 10/2008 | Johnson et al. ............... 714/43 |
| 7,546,585 B2 * | 6/2009 | Ault ............... 717/124 |
| 2002/0152425 A1 * | 10/2002 | Chaiken et al. ............... 714/23 |
| 2003/0182611 A1 | 9/2003 | Wu |
| 2005/0050387 A1 * | 3/2005 | Mariani et al. ............... 714/13 |
| 2005/0086572 A1 | 4/2005 | Hirabayashi |
| 2005/0182997 A1 | 8/2005 | Kushida et al. |

\* cited by examiner

APPARATUS AND METHOD FOR CHECKING AN ERROR DETECTION FUNCTIONALITY OF A DATA PROCESSOR

CROSS-REFERENCE TO RELATED APPLICATION

This application claims priority from German Patent Application No. 102006001872.9, which was filed on Jan. 13, 2006 and is incorporated herein by reference in its entirety.

BACKGROUND OF THE INVENTION

The present invention relates to an apparatus for checking an error detection functionality of a data processing means, particularly in the field of chip cards or smartcards, which are used, for example, in sensitive fields and can thus be subject to attacks.

In sensitive areas concerning security, manifold technical protective measures are employed. These protective measures enable, for example, users to access certain computer systems, authorized persons to be permitted access to certain areas closed to the public, or also to access secured information, such as private keys within the scope of a public key cryptography method, bank data, or credit card information. The authorized user, i.e. for example the authorized user of a computer system or also a person authorized to access a non-public area, for example, often obtains a chip card with a security controller identifying the user as authorized to a security system. A security controller is a microcontroller that may for example be employed on a chip card for monitoring security functions.

Such security systems and security circuits, for example including chip cards, are already subject to attacks due to the value of the goods, information and privileges they protect, which are to be fended off by various countermeasures on the part of the security circuits. The functionality or functional efficiency of the countermeasures has previously been checked by so-called UmSLC modules (UmSLC=User Mode Sensor Life Control). Apart from corresponding supply circuits and evaluation circuits, the central components of the countermeasures have previously been sensors, which are to recognize the attacks. Among the sensors are voltage sensors, frequency sensors, temperature sensors and light sensors, for example. In order to check the functionality of the countermeasures, i.e. the functionality of the various sensors, their supply circuits, and the associated evaluation circuits, the sensors and/or their associated components were adjusted or stimulated by the UmSLC module such that an alarm was triggered. However, the triggered alarm was not judged as an attack, in other words, this alarm was not switched effectively, but it was only checked whether it was generated at all. If the alarm did not take place within the scope of such a test, the UmSLC module assumed a manipulative attack having rendered the sensor inoperative. In such a case, the UmSLC module itself can generate and output an alarm signal, which may lead to the security controller of a chip card and/or the CPU (central processing unit) of the security controller being stopped, sensitive information being destroyed or deleted, or a reset of the security controller being caused.

New countermeasures are now no longer or no longer exclusively based on analog sensors, which detect changes in the environmental conditions or in the operating conditions, respectively, of the respective security components (for example of a security controller), but also comprise logic measures supposed to detect changes of the information. Conventional UmSLC modules therefore no longer meet these requirements.

Data processing means, such as they can be used on a microcontroller or on a chip card, comprise one or several calculating means or arithmetic logic units (ALU). Such an arithmetic logic unit or ALU can be protected against errors by an error detection functionality or error detection function, respectively, according to the prior art. The error detection functions can be realized here, for example, based on checking parity bits, which means a parity-check, or another implementation of an error detection code (EDC). Alternatively or additionally, a second arithmetic logic unit or second ALU, respectively, can calculate or process the same or altered, for example inverted data in parallel, which are then compared with the results of the first ALU in a further step.

Within an attack on the data processing means, an attacker can, for example, try, to interfere with the error detection functionality by a physical attack, for example by deliberately etching back selected areas of the chip comprising the data processing means, and by applying electrical voltages or voltage pulses to certain areas of the chip. Thereby, the attacker can, for example, manipulate the flow of the calculation such that these manipulations will no longer be detected. As a consequence, for example, the result of a calculation, a logic connection or a count can be manipulated such that a microcontroller, which the chip also comprises, can, for example, be caused to reveal actually secret data. The above-described sensors are basically suitable for detecting a corresponding attack on the error detection functionality of the data processing means, but these sensors are always only sensitive to a certain set of attacks.

BRIEF DESCRIPTION OF THE DRAWINGS

These and other objects and features of the present invention will become clear from the following description taken in conjunction with the accompanying drawings, in which.

DESCRIPTION OF THE INVENTION

Figure 1:
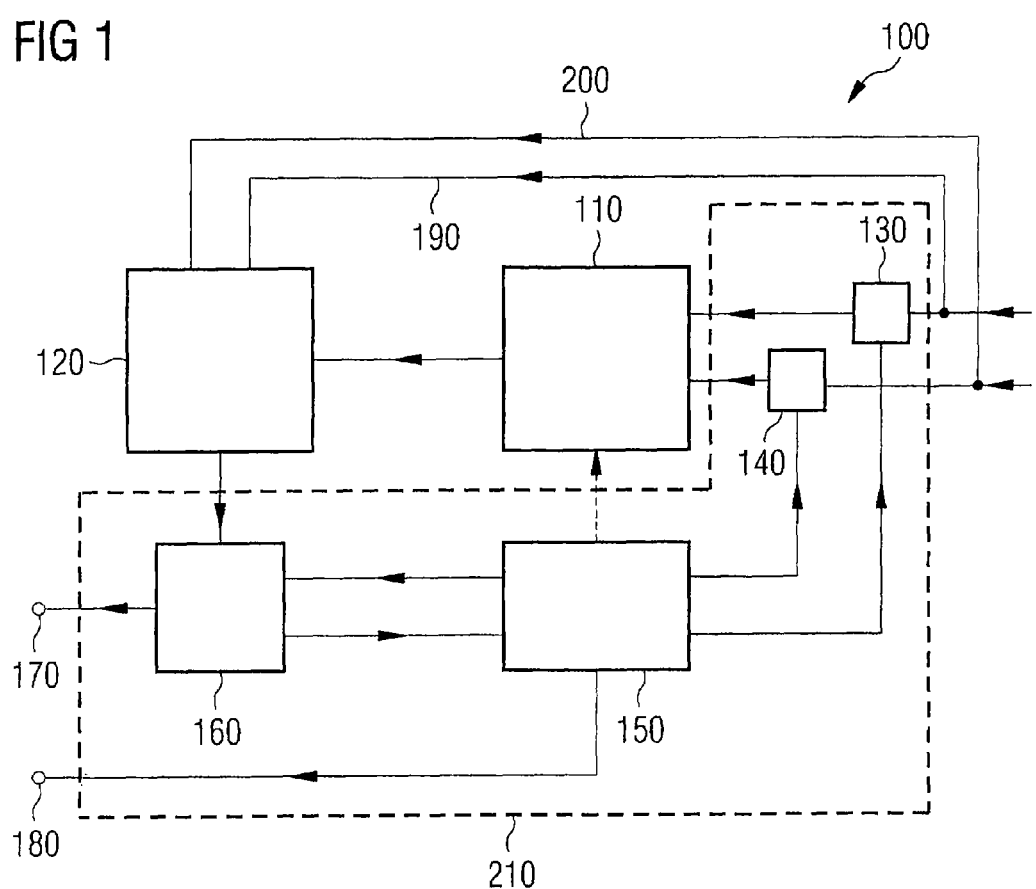
FIG. 1 is a block diagram of an embodiment of a data processing means with an inventive apparatus for checking an error detection functionality.

The present invention provides an apparatus and a method allowing an increased security against attacks on a data processing means.

In accordance with a first aspect, the present invention provides an apparatus for checking an error detection functionality of a data processing means having an arithmetic logic unit, which is implemented to provide an output datum based on an input datum, and an error detection means, which is implemented to execute the error detection functionality and to detect an error during correct execution of the error detection functionality based on the output datum, and, if an error is present, to generate an error signal, having: a control means, which is implemented to pass the error signal through to an error signal output in a normal operating mode, and to block the error signal in a checking mode, in order to not let the error signal pass through to the error signal output, to influence the arithmetic logic unit, the error detection means or the input datum such that the error detection means detects an error during correct execution of the error detection functionality, and, if no error signal is received in response to influencing, does output an alarm signal indicating an incorrect execution of the error detection functionality.

In accordance with a second aspect, the present invention provides a method for checking an error detection functionality of a data processing means with an arithmetic logic unit, which is implemented to provide an output datum based on an input datum, and an error detection means, which is implemented to perform the error detection functionality and to detect an error based on the output datum during correct execution of the error detection functionality, and, if an error is present, to generate an error signal, having the steps of: in a normal operating mode: passing the error signal through to an error signal output; in a checking mode: blocking the error signal to not let the same pass through to the error signal output; influencing the arithmetic logic unit, the error detection means or the input datum, such that the error detection means detects an error during correct execution of the error detection functionality; outputting an alarm signal indicating an incorrect execution of the error detection functionality, if the error detection means does not output an error signal.

In accordance with a third aspect, the present invention provides a program with program code for performing the above-mentioned method for checking an error detection functionality of a data processing means, when the program runs on a processor.

The present invention is based on the knowledge that increased security against attacks on a data processing means can be achieved in that a control means checks the error detection functionality of the data processing means for its efficiency during operation. This results in the advantage that in an attack, manipulation of a calculating unit cannot be disguised in that the error detection means is affected in its functionality such that a manipulation, which would actually have to be detected as erroneous when checking within a correct execution of the error detection functionality, is detected as error-free.

For that purpose, the inventive apparatus forces one or several errors in the data processing means, by either influencing an input datum supplied to the calculating unit, or the calculating unit itself, such that during checking in the case of a correct execution of the error detection functionality, an error signal would have to be caused. If the inventive apparatus does not receive the expected error signal, a manipulation or an attack, respectively, on the data processing means is assumed. In this case, the control means itself does output an alarm signal, which indicates a performed attack to other components, which are coupled to the inventive apparatus.

Hereby, the control means can manipulate both the calculating unit itself, as well as the input datum provided to the calculating unit, based on which the calculating means provides an output datum. Thereby, the advantage results that the inventive apparatus has different possibilities for checking the error detection functionality, so that an attack on the data processing means has to resist a plurality of checks to have a chance for successful performance.

It is another advantage that checking can be performed during operation. Checking can be initiated by the presence of a triggering condition. Thereby, an attack is made harder for an attacker, since he has to expect checking of the error detection functionality not only at certain events, such as system start.

Additionally, the embodiments show that the inventive apparatus can not only monitor outputting of an error signal in response to influencing, which means that the inventive apparatus not only monitors the error detection means for detecting errors. Rather, the same also allows to perform checking of the detection recognition functionality after successful error detection, without an error being present. The resulting advantage is that thereby a possible attack is again made harder due to the increased complexity of checking, since the control means no longer expects an error signal with every check.

Now, with reference to FIGS. 1 and 2, an inventive apparatus for checking an error detection functionality of a data processing means will be described. Similar or equal objects are thereby designated with similar or equal reference numbers.

FIG. 1 shows a block diagram of an embodiment of a data processing means 100 with an inventive apparatus for checking an error detection functionality or EDC function (EDC=error detection code) of the data processing means 100, as it can be used, for example, in a security controller on a chip card. The inventive data processing means 100 has a calculating means or arithmetic logic unit 110 (ALU). The arithmetic logic unit or ALU 100, respectively, is coupled to an error detection means 120 with an output.

Additionally, in the embodiment shown in FIG. 1, the arithmetic logic unit has a first input coupled to a first manipulator 130, and a second input coupled to a second manipulator 140. A first input datum can be provided to the first manipulator 130 and the second manipulator 140 by a component not shown in FIG. 1 via a first input data line. Correspondingly, a second input datum can be provided to the second manipulator 140, also by a component not shown in FIG. 1, via a second input data line. The two manipulators 130, 140 are each connected to a UmSLC control unit 150 (UmSLC=Usermode Sensor Life Control), such that the same can activate the two manipulators 130, 140.

Possible realizations of the two manipulators 130, 140 will be discussed and explained below.

Additionally, the UmSLC control unit 150 is coupled to a switch 160 via a bidirectional connection, to control, on the one hand, the switch 160, and to receive, on the other hand, the error signal via the switch 160. Here, the error signal can be generated by the error detection means 120, which is also connected to the switch 160 for that purpose.

Additionally, the switch 160 is connected to an error signal output 170, where the error detection means 120 can output an error signal indicating an erroneous execution of a calculation operation to an external component. The UmSLC control unit 150, which is also referred to as UmSLC module or short UmSLC (UmSLC =Usermode Sensor Life Control) is connected to an alarm signal output 180, via which the inventive apparatus can provide an alarm signal to a further component not shown in FIG. 1, which indicates failed checking of the error detection functionality of the data processing means 100, and thus indicates an attack or manipulation, respectively, of the data processing means 100.

Additionally, in the embodiment of the inventive apparatus for checking an error detection functionality of a data processing means 100 shown in FIG. 1, the error detection means 120 is coupled to the first input data line via a first data transfer line 190 and to the second input data line via a second data transfer line 200.

Thus, the UmSLC control unit 150, the switch 160 and the two manipulators 130, 140 form a control unit 210. Thus, FIG. 1 shows a data processing means 100 with an UmSLC for an ALU 110, as it can be used, for example, in a security controller.

In a normal operating mode, which means when the UmSLC control unit 150 does not check the error detection functionality of the data processing means 100, the two manipulators 130, 140 and the switch 160 are brought to a neutral state. In the neutral state, the two manipulators 130, 140 do not influence the incoming input data, but let the same pass freely, so that the same are available for the arithmetic logic unit 110 in an unaltered way. In the neutral state, the switch 160 connects the error detection means 120 to the error signal output 170.

If the first and second input data are provided to the arithmetic logic unit 110 via the first and second input data lines in the normal operating mode, the arithmetic logic unit 110 will combine the two input data with the help of one or several arithmetic and/or logic operations to one output datum, which is provided to the error detection means together with the first and second input data in an embodiment shown in FIG. 1. Now, the error detection means 120 checks the output datum for the existence of an error, based on the two input data and the output datum. If the error detection means 120 detects the presence of an error during this check, it generates an error signal, which is output to the error signal output 170 via the switch 160.

Thereby, the error detection means 120 can enable checking for the presence of an error, which means the error detection functionality, by different algorithms and procedures. For example, the arithmetic logic unit or ALU can be protected against errors by error detection functions, such as a parity-check or other error-detecting codes and methods according to the prior art. Apart from the already mentioned parity-check, the output datum can be realized, for example, via a CRC checksum (CRC=cyclic redundancy check), or a one-way hash value, such as it can be calculated, for example, with the help of the one-way hash algorithms MD2, MD4, MD5 or RIPEMD-160. Depending on the complexity of the used error detection function or error detection functionality, it is thus required to equip the error detection means 120 itself with a more or less complex ALU or a more or less complex arithmetic logic unit, respectively.

If no error is detected in the error check in the normal operating mode, the result of the calculation of the arithmetic logic unit 110 can be output to an external component not shown in FIG. 1. If, however, an error is detected in the error check, the security controller, the microcontroller, the chip card, a CPU (central processing unit) or another external component coupled to the data processing means 100 shown in FIG. 1, or comprising the same, can react in response to the error signal provided at the error signal output 170. Possible reactions are, for example, a termination of a running program with an output of a corresponding error message, a reset of a system comprising the data processing means 100, or a renewed instruction to perform the corresponding calculation.

If a predetermined trigger condition is fulfilled, the UmSLC control unit 150 changes from the normal operating mode to a checking mode and initiates checking of the error detection functionality of the data processing means 100. This trigger condition can be, for example, expiration of a predetermined period of time, or reaching a predetermined system time or the arrival of a corresponding CPU instruction. Also, a random fulfillment of the trigger condition is possible, such as it can be realized, for example, by a (pseudo) random number generator or a corresponding predetermined portion of the number range of the (pseudo) random number generator. In this context, it is important that the trigger condition is an intermittently fulfilled condition, which allows normal access to the data processing means 100, and above that allows initiation of checking the error detection functionality when the trigger condition is fulfilled.

If the trigger condition is fulfilled, the new UmSLC function of the UmSLC control unit 150 forces one or several errors to check the error function or the error detection functionality, respectively. Therefore, first, the alarm function of the ALU 110, which means the protection of the arithmetic logic unit 110 realized by the error detection means 120, is redirected to the UmSLC control unit 150 in the form of an error signal by activating the switch 160. Then, an error is simulated in the ALU or the arithmetic logic unit 110, respectively. In the embodiment of a data processing means 100 shown in FIG. 1, this can be obtained for example by activating one of the two or by activating both manipulators 130, 140 through the UmSLC control unit 150. The arithmetic logic unit 110 provides an output datum having an error to the error detection means 120 based on the input data influenced by the two manipulators 130, 140, whereupon the error detection means 120 does output an error signal in the case of a correct execution of the error detection functionality.

Due to the switch 160, which is switched compared to the neutral state, the error signal is not passed on to the error signal output 170, but provided to the UmSLC control unit or the UmSLC module 150, respectively. In other words, the UmSLC control unit then has to obtain an error message in the form of the error signal from the ALU check by the error detection means 120. If this is does not take place, which means the error signal is not generated after influencing the input data by the two manipulators 130, 140, the UmSLC control unit or the UmSLC module 150, respectively, generates an alarm signal (alarm) as error message and does output the same at the alarm signal output 180, since in this case a manipulation, which means an attack, has to be assumed. In this case, an external component not shown in FIG. 1 can take countermeasures based on the alarm signal provided at the alarm signal output 180, such as executing a security reset, deleting security-relevant or sensitive data, destroying specific components of the system comprising the data processing means 100 to make the system useless, or other measures.

In the case of a correct execution of the error detection functionality, which means when an error signal is generated by the error detection means 120 based on influencing the two manipulators 130, 140 and is transmitted to the UmSLC control unit 150 via the switch 160, the correct execution of the error detection functionality can be performed in a second checking step. For that purpose, the UmSLC control unit 150 instructs the two manipulators 130, 140 to cancel the influencing of the input data and to revert to the neutral state. Thereby, the simulation of an error in the arithmetic logic unit 110 is deactivated, so that the result of the combination of the input data would have to lead to a correct or error-free output datum, respectively, which is transmitted to the error detection means 120. In this case, the error detection means 120 should determine no error, whereupon no error signal is provided or the generated error signal is deleted, respectively. The deletion of the error signal or withdrawal of the error signal, respectively, is transmitted to the UmSLC control unit 150 via the switch 160.

In other words, in the correct operating case, which means when the error detection functionality is executed correctly, the ALU error or its simulation, respectively, is turned off again, after the UmSLC module 150 has obtained the ALU error message in the form of the error signal and the withdrawal of the ALU error message in form of the error signal is waited for.

If the withdrawal or deletion of the error signal, respectively, is not detected within this second substep of checking the error detection functionality of the data processing means 100, again, a manipulation or an attack, respectively, can be assumed, so that the UmSLC control unit 150 does output an alarm signal, which is provided at the alarm signal output 180. After the termination of checking the error detection functionality of the data processing means 100, the UmSLC control unit 150 resets the switch 160 into the neutral state, so that an error signal generated by the error detection means 120 is switched through directly to the error signal output 170 and is not redirected to the UmSLC module 150. With this last step of switching the switch 160, the inventive apparatus has again returned to the normal operating mode. In other words, the ALU alarm line is then switched back again to the original alarm module not shown in FIG. 1.

The two manipulators 130, 140 can be implemented in different ways. In the case of using an error code, for example within a parity-check or another error-detecting code (EDC), the data can be, for example, manipulated by an (bitwise) XOR operation (XOR=exclusive OR). By a bitwise XOR operation, inversion of individual bits of the data or inversion of the whole datum, respectively, can be caused or generated specifically. Alternatively or additionally, an error simulation of a "stuck at 1" or "stuck at 0" error can be implemented in the two manipulators 130, 140, where individual bits or the whole datum are fixed or modified, respectively, which means to a predetermined value, to a logic 0 or logic 1 depending on the error. In this case, the error codes are to detect these errors when checking is performed by the error detection means 120, and then notify the UmSLC module 150 of this error by generating an error signal.

Apart from influencing by an XOR operation or a simulated "stuck at 1" or "stuck at 0" error, it is also possible to implement the two manipulators 130, 140 with the possibility of shifting the bits of the corresponding datum. Thereby, shifting can be performed by a predetermined number of bits or, for example, by a number of bits determined by the UmSLC control unit 150 or an arbitrary number. Also, the direction of shifting can be predetermined or can be, for example, determined by the UmSLC module 150. Additionally, the type of shift can also be predetermined or determined by the UmSLC module 150, respectively, whereby the type of shift means the question whether the bits of the respective datum are shifted cyclically or whether the datum is padded with bits that are predetermined, randomly determined or derived from the data word. Influencing, however, should preferably operate such that the manipulation also causes this change of the datum.

A further embodiment of the present invention is that the UmSLC control unit 150 does not or not exclusively influence the input data of the arithmetic logic unit 110, but also influences the arithmetic logic unit 110 directly, as this is indicated in FIG. 1 by the dotted connection between the UmSLC control unit 150 and the arithmetic logic unit 110. Such an embodiment can be implemented, for example, by modifying the output datum derived from the input data by using a "downstream" manipulator. Such a "downstream" manipulator can both be implemented as part of the arithmetic logic unit 110 and as independent unit, which means comparable to the two manipulators 130, 140. Such a "downstream" manipulator can be implemented analogously to one of the two manipulators 130, 140, so that this manipulator can obtain a partial inversion of the data by a bitwise XOR operation, or a modification of the data, for example by simulating a "stuck at 1" or "stuck at 0" error. Also, for such a manipulator, shifting the data is possible, as has already been discussed in the context of the two manipulators 130, 140. Influencing the arithmetic logic unit 110 can of course also be performed by directly influencing the arithmetic logic unit 110, so that the same provides an erroneous output datum based on the two input data, which would have had another value without influencing by the UmSLC control unit 150. In the case of using error-detecting codes (EDC), it is also possible to influence the arithmetic logic unit 110 such that only part of the output datum comprising the "error-detecting code", which means the EDC, is manipulated. This can, for example, be performed by influencing a part of the arithmetic logic unit 110, which generates the error-detecting code.

Depending on the specific implementation of the data processing means 100, the implementation of the first data transfer line 190 and the second data transfer line 200 to the error detection means 120 may possibly be omitted. This is for example the case when checking the output datum on an error consists of checking whether the output datum has a value, which is within a predetermined subset of all possible values. Implementing the two data transfer lines 190, 200 can also be omitted when checking the output datum for the presence of an error consists of checking the value of an individual bit, for example to check whether the output datum has an even or odd value. Further, implementing the two data transfer lines 190, 200 can be omitted when, for example, in the case of influencing the arithmetic logic unit 110 or when using a "downstream" manipulator, respectively, individual bits of the output datum are inverted, so that, for example, the parity of the output datum transmitted to the error detection means 120 deviates from a value, which is predetermined or transmitted to the error detection means 120. Depending on the implementation of the data processing means 100, a more or less complex implementation of an arithmetic logic unit or ALU, respectively, as part of the error detection means 120 is required.

Thus, advantageously, the above embodiments allow checking an attack detection for arithmetic logic units, which are also referred to as ALU and can be implemented as part of, for example, a CPU (CPU=central processing unit), a processor, a (pseudo) random number generator, a special processor, a cryptoprocessor or another integrated circuit. The above apparatuses for checking an error detection functionality of a data processing means 100 allow it particularly to test new logic countermeasures during operation with regard to the detection possibility of attacks, which means with regard to their efficiency. Thus, they provide a new UmSLC function for the alarm unit for protecting the ALU or the arithmetic logic unit 110, respectively, and allow thus the application of a new UmSLC for checking detection of an attack on a CPU or an ALU of a CPU, respectively.

Figure 2:
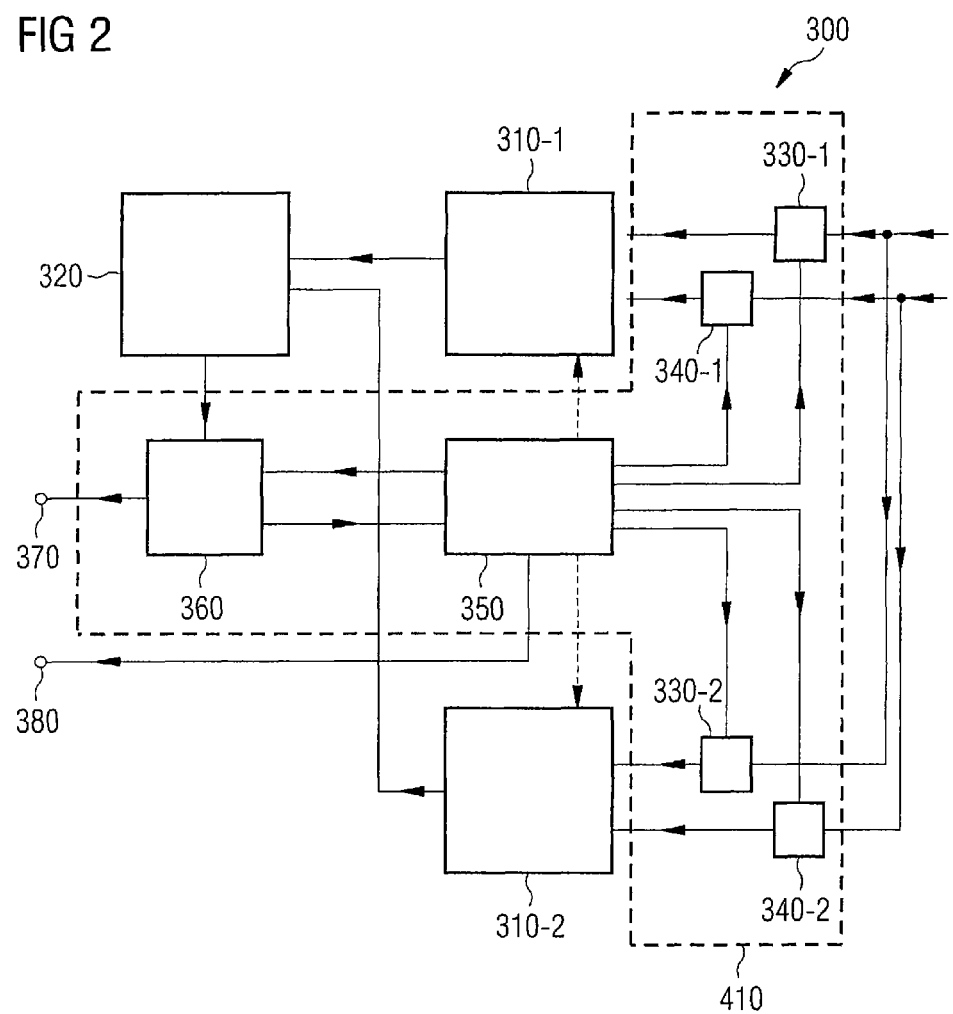
FIG. 2 is a block diagram of another embodiment of a data processing means with an inventive apparatus for checking an error detection functionality.

FIG. 2 shows a block diagram of another embodiment of an inventive apparatus for checking an error detection functionality of a data processing means 300. The data processing means 300 has a first arithmetic logic unit 310-1 and a second arithmetic logic unit 310-2. Both the first arithmetic logic unit 310-1 and the second arithmetic logic unit 310-2 are each connected to an error detection means 320 by an output. The two arithmetic logic units 310-1, 310-2 each have an input for a first input datum or a datum derived from the first input datum, and a second input for a second input datum or a datum derived from the second input datum, respectively. Here, the first input of the two arithmetic logic units 310-1, 310-2 is connected to a first manipulator 330-1, 330-2, and each of the second inputs of the two arithmetic logic units 310-1, 310-2 is each connected to a second manipulator 340-1, 340-2. Here, the two first manipulators 330-1, 330-2 are each connected to the first input data line. The second manipulators 340-1, 340-2 are each connected to the second input data line.

The four manipulators 330-1, 330-2, 340-1, 340-2 are each connected to a UmSLC control unit 350 via a control line. Additionally, the UmSLC control unit 350 is coupled to a switch 360, which itself is connected to the error detection means 320 and an error signal terminal 370. Additionally, the UmSLC control unit 350 is connected to an alarm signal output 380. Thus, the UmSLC control unit 350, the switch 360 and the four manipulators 330-1, 330-2, 340-1, 340-2 form a control means 410.

The mode of operation of the data processing means 300 in FIG. 2 differs only slightly from the data processing means 100 shown in FIG. 1. In the normal operating mode, which means when the trigger condition is not fulfilled, the switch 360 and the four manipulators 330-1, 330-2, 340-1, 340-2 are each in a neutral state. This means that the switch 360 connects, for example, the error detection means 320 to the error signal output 370. The four manipulators 330-1, 330-2, 340-1, 340-2 do not influence the data, which pass through the same, so that in the case of a data processing means 300 operating without errors, identical results are respectively provided as output data to the error detection means 320 due to connecting the inputs of the two arithmetic logic units 310-1, 310-2. In this case, the error detection functionality implemented in the error detection means 320 can consist of comparing the two output data of the two arithmetic logic units 310-1, 310-2 with each other, and to output an error signal in the case of a deviation of the two output data of the two arithmetic logic units 310-1, 310-2.

Additionally, there is the possibility to perform a full bitwise inversion of the input data as a neutral state of the first manipulator 330-2 and the second manipulator 340-2 of the second arithmetic logic unit 310-2. In this case, the two arithmetic logic units 310-1, 310-2 do no longer provide identical results. Rather, the second arithmetic logic unit 310-2 provides an output datum determined based on the "partly" inverted input data, which is transmitted to the error detection means 320. In this case, generally, a more complex comparison of the output data of the two arithmetic logic units 310-1, 310-2 has to be implemented in the error detection means 320, since in this case, the two output data generally have a more complex relation to each other. By using the second arithmetic logic unit 310-2, implementing a parity comparison or an error-detecting code (EDC) is not required. In other words, as an alternative to explicitly using an error detection functionality, for example in the form of a parity comparison or usage of another error-detecting code (EDC), a second arithmetic logic unit or a second ALU 310-2, respectively, can calculate the same or altered, for example inverted, data in parallel, which are compared with the results of the first ALU 310-1 in a further step in an error detection means 320.

If the trigger condition is fulfilled, the data processing means 300 and thus the UmSLC control unit 350 switches, from the normal operating state to a checking mode. In the data processing means 300 shown in FIG. 2, the switch 360 is there also controlled such that an error signal output by the error detection means 320 is blocked and no longer passed through to the error signal output 370. Rather, an error signal output by the error detection means 320 is redirected or passed on, respectively, to the UmSLC control unit 350. Additionally, one or several of the manipulators 330-1, 330-2, 340-1, 340-2 are controlled and thus brought out of the neutral state. In the case that the neutral state of the manipulators 330-1, 330-2, 340-1, 340-2 consists of leaving the data passing through the manipulators unaltered, deviating output data of the two arithmetic logic units 310-1, 310-2 will result due to controlling one or several manipulators. Due to the different output data words, which are provided to the error detection means 320, the same should detect an error and then output an error signal, which is passed on to the UmSLC module 350 by the switch 360 and is not passed through to the error signal output 370.

If the UmSLC control unit 350 receives no error signal from the error detection means 320 via the switch 360 in response to influencing the input data by the manipulators 330-1, 330-2, 340-1, 340-2, a manipulation of the error detection means 320 or an attack, respectively, can be assumed, whereupon the UmSLC control unit 350 provides an alarm signal at the alarm signal output 380. The alarm signal can be tapped at the alarm signal output 380 by an external component not shown in FIG. 2. In response to the alarm signal, corresponding measures, for example initiating a security reset, deleting sensitive or security-relevant data or specifically destroying individual components of the system comprising the data processing means 300 can be initiated to make the system useless.

However, in a correct operating case, which means when the UmSLC control unit 350 has obtained the ALU error message in the form of the error signal, the ALU error or its simulation, respectively, is switched off again, and the withdrawal of the ALU error message in the form of the error signal is waited for. This means that the manipulators 330-1, 330-2, 340-1, 340-2 are again switched to their neutral state by the UmSLC control unit 350 after receiving the error signal. If then no error signal is transmitted to the UmSLC control unit 350 by the error detection means 320 via the switch 360, due to a renewed calculation of the output data by the two arithmetic logic units 310-1, 310-2, the switch 360 is also brought again to its neutral state, where a possible error signal can reach the error signal output 370 from the error detection means 320 and is not blocked. By switching the switch 360 into the neutral state, checking the error detection functionality of the data processing means 300 is terminated in this embodiment, and the data processing means 300 switches again from the checking mode to the normal operating mode.

If, however, the error signal remains or is not deleted, respectively, after the deactivation of the manipulators 330-1, 330-2, 340-1, 340-2, which means switching the manipulators into the neutral state, the UmSLC control unit 350 here assumes also an attack or manipulation, respectively, and does output an alarm signal indicting an attack at the alarm signal output 380.

Similar to an embodiment of a data processing means 100 already shown in the context of FIG. 1, the manipulators 330-1, 330-2, 340-1, 340-2 can be implemented such that they manipulate the data by a (bitwise) XOR operation, which causes an inversion of individual or all bits of the input data. Additionally or alternatively, there is the possibility to simulate the data, in this case the input data of the two arithmetic logic units 310-1, 310-2 by a "stuck at 1" or "stuck at 0" error, which means to force the manipulation of the data. Also, in the manipulators 330-1, 330-2, 340-1, 340-2 shifting the bits of the data passing through the manipulators, which has already been described in the context of the manipulators 130, 140, can be applied. When using a system, for example a CPU, a (pseudo) random number generator, a special processor, a cryptoprocessor, a processor or another integrated circuit with two arithmetic logic units 310-1, 310-2, the input data are changed to one or to both arithmetic logic units or ALU modules 310-1, 310-2. Here, it has to be noted that in the case that the input data of both arithmetic logic units 310-1, 310-2 are changed, this change has to be performed in different ways to ensure that an error is generated in the form of two output data deviating from each other. The manipulators 330-1, 330-2, 340-1, 340-2 have to be implemented such that the ALU control circuit or the error detection means 320, respectively, detects the deliberately erroneous or different calculation of the two arithmetic logic units or ALUs 310-1, 310-2, and can notify the error in the form of the error signal to the UmSLC module 350.

Under the above-described preconditions of the checking mode, the different calculations of the two ALUs or the two arithmetic logic units 310-1, 310-2, respectively, do then not cause an alarm in the form of an error signal, but are part of the correct test behavior within the new UmSLC function, which is performed by the UmSLC module 350 or the UmSLC 350, respectively.

In the embodiment shown in FIG. 2, different modifications resulting in new embodiments are also possible. If, for example, the neutral state of the two manipulators 330-2, 340-2 of the second arithmetic logic unit 310-2 is a state where individual or all bits of the input data are inverted, for example by applying an XOR operation in the manipulators, generally, a more complex error detection algorithm than a simple comparison of the two output data of the two arithmetic logic units 310-1, 310-2 should be implemented in the error detection means 320, which can vary depending on different operations through the two arithmetic logic units 310-1, 310-2.

Additionally, there is the possibility that the UmSLC control unit 350 also directly influences the two arithmetic logic units 310-1, 310-2 individually or together, respectively. For example, it is possible that influencing in this case is such that the output datum output by the arithmetic logic units 310-1, 310-2 is influenced or manipulated, respectively. Here, the same influencing or manipulations, respectively, can be applied, as have been described with reference to the manipulators 330-1, 330-2, 340-1, 340-2. In this case, influencing the arithmetic logic units 310-1, 310-2 by the UmSLC control unit 350 could be to activate a "downstream" manipulator and to then deactivate the same again. Additionally, the two arithmetic logic units 310-1, 310-2 can also be implemented such that a manipulation is realized by performing the correct calculation of the output data based on the input data by a manipulation of the parts of the arithmetic logic unit 310-1, 310-2, which performs the actual calculation, which means the connection of the input data to the output data.

A further modification of the embodiment shown in FIG. 2 consists of using error codes, such as a parity-check (parity) or other error-detecting codes (EDC). When using error codes with one or several arithmetic logic units or ALUs 310-1, 310-2, respectively, the data, which means the input data or the output data, can again be modified by an XOR operation, which causes inversion of individual or all bits of the respective data, by simulating a "stuck at 1" or "stuck at 0" error or by an already described shift of the bits. In this case, a manipulation of the parts of the arithmetic logic units 310-1, 310-2 is also possible, which are responsible for calculating the error detection code (EDC). In this case, influencing the two arithmetic logic units 310-1, 310-2 can be to manipulate only the error-detecting codes.

Thus, a combination or sequential usage of the embodiments described in FIGS. 1 and 2 is possible. Depending on the implementation, it can be necessary to also provide the input data in the form of further input data of the two arithmetic logic units to the error detection means, which means in the case of the embodiment of the error detection means 320 shown in FIG. 2, apart from the output data of the two arithmetic logic units 310-1, 310-2, which means the output datum of the first arithmetic logic unit 310-1 and the second output datum of the second arithmetic logic unit 310-2.

A further modification of the embodiment shown in FIG. 2 is to partly not use the error detection functionality, which means the error detection means 320 in the normal operating mode, in order to use the two arithmetic logic units 310-1, 310-2 separately for different calculations, for example to accelerate a calculation. In this case, it is possible to use the error detection functionality "only sometimes", which means only when a further trigger condition is fulfilled. In this case, the error detection functionality would be initiated by intermittently fulfilling the further triggering condition. Additionally, in this case, it is required to provide different input data, which means input data not derived from each other, to the two arithmetic logic units 310-1, 310-2, in deviation from the connection shown in FIG. 2.

Further, it should be noted that the second arithmetic logic unit 310-2 can also be seen as part of the error detection means 120 of the embodiment shown in FIG. 1. Thus, there is basically the possibility to convert the embodiment shown in FIG. 2 also into the embodiment shown in FIG. 1. Contrary thereto, however, the embodiment shown in FIG. 2 allows in this case influencing the error detection means by the two manipulators 330-2, 340-2, which would correspond to influencing the error detection means 120 in FIG. 1.

Further, it should be noted that in deviation from the above-described embodiments, it is not required to provide exactly two input data to the arithmetic logic units.

Rather, it is possible that the arithmetic logic units only require or obtain, respectively, a single input datum or a plurality of input data.

Here, the data processing means can be part of a CPU, a (pseudo) random number generator, a cryptoprocessor, a special processor, a processor, a memory circuit or another integrated circuit, which is again part of a system, for example a computer, a PC (personal computer), a PDA (personal data assistant), a chip card or another processor-aided system comprising a processor.

Depending on the conditions, the inventive method for checking an error detection functionality of a data processing means can be implemented in hardware or in software. The implementation can be performed on a digital memory medium, particularly a disc, CD or DVD with electronically readable control signals, which can cooperate with a programmable computer system such that the inventive method for checking an error detection functionality of a data processing means is performed. Generally, thus, the invention consists also in a software program product or a computer program product or a program product with a program code stored on a machine-readable carrier for performing the inventive method, respectively, when the software program product runs on a computer or a processor. In other words, the invention can be realized as computer program or software program or program with a program code for performing the method, respectively, when the program runs on a processor. The processor can thereby be formed by a computer, a chip card (smartcard) or another integrated circuit.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A chip card or smart card security controller comprising
   a data processor having an arithmetic logic unit configured to calculate an output datum based on at least one an input datum,
   an error detector configured to check the output datum for an error based on the output datum and the at least one input datum, and, if an error is present, generates an error signal; and a controller configured to
  alternately switch between a normal operating mode and a checking mode,
  pass the error signal through to an error signal output in the normal operating mode, and blocks the error signal in a checking mode, in order to not let the error signal pass through to the error signal output;
  each time the controller switches to the checking mode,
    influences the arithmetic logic unit, the error detector or the input datum such that the error detector detects an error and, if no error signal is received in response to the influencing, output an alarm signal indicating an incorrect execution of the error detection functionality; and
    subsequently, cause the error detector to check the output datum with regard to an error without influencing the arithmetic logic unit, the error detector and the input datum, and output the alarm signal, if the controller receives a further error signal from the error detector in response to the causing,
  a circuit adapted to execute a security reset in response to receiving the alarm signal, and adapted to perform one of a termination of a program currently running on the chip card, a security reset and a renewal of an instruction initiating the calculation of the arithmetic logic unit, in response to receiving the error signal via the error signal output.

2. The chip card or smart card security controller according to claim 1, wherein the data processor comprises a further arithmetic logic unit configured to compute a further output datum based on a further at least one input datum so that, in case of the further at least one input datum being equal to the at least one input datum, the further output datum equals the output datum, and wherein the error detector is configured to check the output datum on the basis of a comparison between the output datum and the further output datum.

3. The chip card or smart card security controller according to claim 2, wherein the controller is configured to, in the influencing concurrently and in a manner different from the arithmetic logic unit, influence the further arithmetic logic unit or the further input datum, to cause an error during correct execution of the error detection functionality by the error detector.

4. The chip card or smart card security controller according to claim 2, wherein the chip card is configured such that, preliminarily, the error detector is disabled and the further arithmetic logic unit is used along with the arithmetic logic unit separately and concurrently for different calculations so as to accelerate a calculation task.

5. The chip card or smart card security controller according to claim 1, wherein the error detector infers an error when the output datum fulfills a predetermined condition.

6. The chip card or smart card security controller according to claim 1, wherein the error detector infers an error when the output datum and the input datum do not have a predetermined relation to each other.

7. The chip card or smart card security controller according to claim 1, wherein the controller is configured to switch to the checking mode each time a predetermined trigger condition is fulfilled, and switch back to the normal operating mode upon the influencing and subsequent causing.

8. The chip card or smart card security controller according to claim 7, wherein the controller is configured such that the predetermined trigger condition is fulfilled on a regularly basis, in case of an arrival of a predetermined CPU instruction, or on a random basis.

9. A digital memory medium comprising a program with program code for performing the method comprising:
calculating, performed by an arithmetic logic unit, an output datum based on at least one an input datum,
checking, performed by an error detector, the output datum for an error based on the output datum and the at least one input datum, and, if an error is present, generate an error signal, and
alternately switching between a normal operating mode and a checking mode,
passing the error signal through to an error signal output in the normal operating mode, and blocking the error signal in a checking mode, in order to not let the error signal pass through to the error signal output;
each time the checking mode is switched to,
  influencing the arithmetic logic unit, the error detector or the input datum such that the error detector detects an error and, if no error signal is received in response to the influencing, outputting an alarm signal indicating an incorrect execution of the error detection functionality; and
  subsequently, causing the error detector to check the output datum with regard to an error without influencing the arithmetic logic unit, the error detector and the input datum, and outputting the alarm signal, if the controller receives a further error signal from the error detector in response to the causing,
executing a security reset in response to receiving the alarm signal, and
performing one of a termination of a program currently running on the chip card, a security reset and a renewal of an instruction initiating the calculation of the arithmetic logic unit, in response to receiving the error signal via the error signal output.

10. A method, comprising:
calculating, performed by an arithmetic logic unit, an output datum based on at least one an input datum,
checking, performed by an error detector, the output datum for an error based on the output datum and the at least one input datum, and, if an error is present, generate an error signal, and
alternately switching between a normal operating mode and a checking mode,
passing the error signal through to an error signal output in the normal operating mode, and blocking the error signal in a checking mode, in order to not let the error signal pass through to the error signal output;
each time the checking mode is switched to,
  influencing the arithmetic logic unit, the error detector or the input datum such that the error detector detects an error and, if no error signal is received in response to the influencing, outputting an alarm signal indicating an incorrect execution of the error detection functionality; and
  subsequently, causing the error detector to check the output datum with regard to an error without influencing the arithmetic logic unit, the error detector and the input datum, and outputting the alarm signal, if the controller receives a further error signal from the error detector in response to the causing,
executing a security reset in response to receiving the alarm signal, and
performing one of a termination of a program currently running on the chip card, a security reset and a renewal of an instruction initiating the calculation of the arithmetic logic unit, in response to receiving the error signal via the error signal output.

* * * * *